(No Model.) 2 Sheets—Sheet 2.
G. S. HILTS.
PIPE WRENCH.
No. 483,785. Patented Oct. 4, 1892.
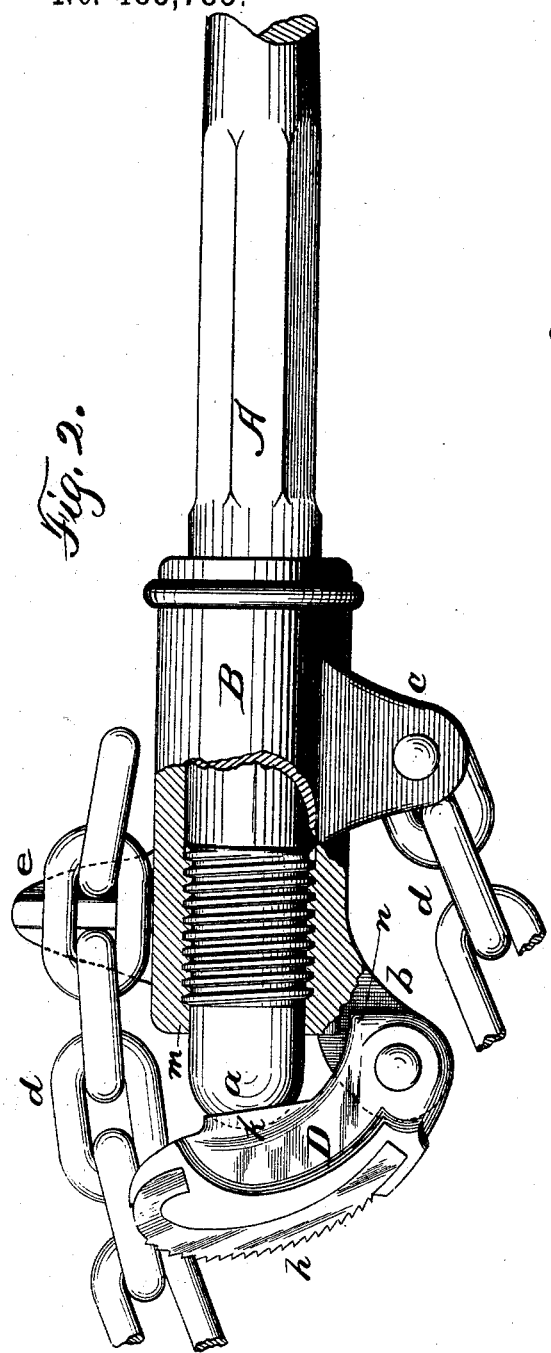
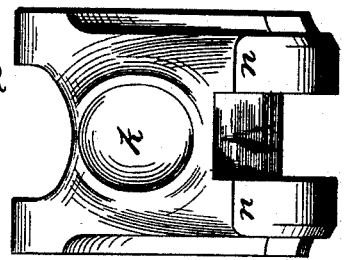
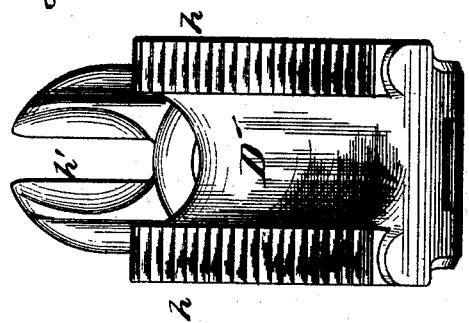
WITNESSES:
H. A. Carhart.
C. B. Kinne.
INVENTOR.
George S. Hilts.
BY
Smith & Denison
ATTORNEYS.

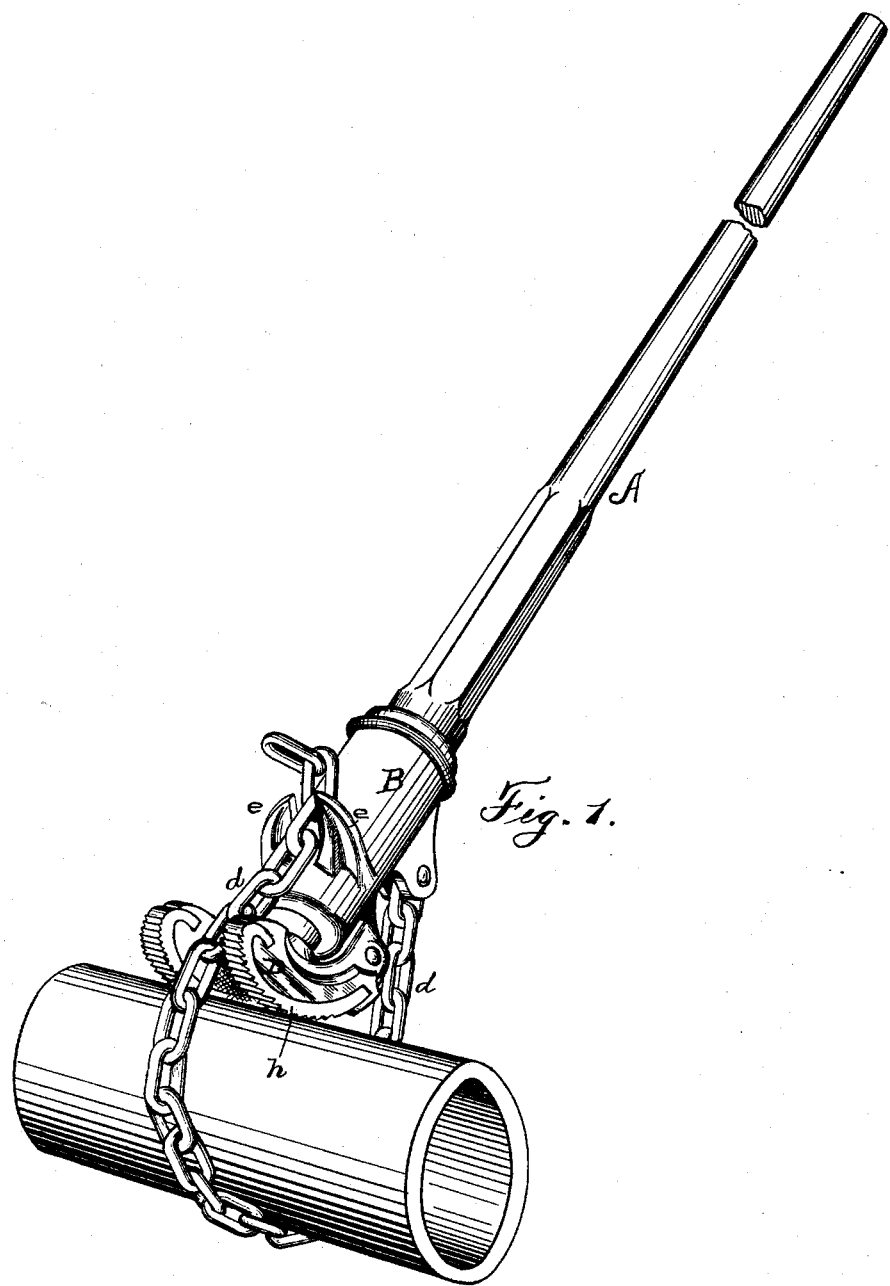

UNITED STATES PATENT OFFICE.

GEORGE S. HILTS, OF GROTON, NEW YORK, ASSIGNOR OF TWO-THIRDS TO DUNCAN McLACHLAN, OF SAME PLACE.

PIPE-WRENCH.

SPECIFICATION forming part of Letters Patent No. 483,785, dated October 4, 1892.

Application filed March 23, 1892. Serial No. 426,096. (No model.)

*To all whom it may concern:*

Be it known that I, GEORGE S. HILTS, of Groton, in the county of Tompkins, in the State of New York, have invented new and useful Improvements in Pipe-Wrenches, of which the following, taken in connection with the accompanying drawings, is a full, clear, and exact description.

My invention relates to that class of pipe-wrenches in which an adjustable chain partly encircles the pipe and in conjunction with a toothed dog grips the pipe.

My object is to produce a pipe-wrench in which the chain is adjustable, and in which the grip or bite of the toothed dog is variable, said dog being pivotally mounted or hinged to a sleeve, which is threaded to permit the handle to be screwed in so as to bear against the back of the dog, and thereby force the teeth more or less into the pipe, and also to hold them in such close contact therewith that the eccentric throw of said dog will cause them to bite more thoroughly into the pipe, and in which the toothed portion of the dog is removable from the body thereof, and in which the slack of the chain can be taken up by adjusting and rotating the handle.

My invention consists in the several novel features of construction and operation hereinafter described, and which are specifically set forth in the claims hereunto annexed. It is constructed as follows, reference being had to the accompanying drawings, in which—

Figure 1 is an isometrical elevation of the wrench applied to a pipe. Fig. 2 is a side and partially-longitudinal sectional elevation of the wrench, part of the chain being broken out. Fig. 3 is a front elevation of the gripping-dog detached. Fig. 4 is a rear elevation of the same.

A is the handle or lever, threaded adjacent to its front end and screwed into the interiorly-threaded sleeve B, and the front end of said lever is rounded off, substantially as shown at $a$. The sleeve is provided with an arm $b$, with a lug or lugs $c$, to which one end of the chain $d$ is secured, and on the opposite side with prongs or forks $e$, to which the free end of the chain is detachably connected. Upon the arm $b$ the dog D is pivotally mounted or hinged, its front face being recessed and mortised, so as to permit the toothed segment $h$ to be slid in edgewise, so that when one segment becomes worn it can be readily replaced by another. Its free end is slotted, as at $h'$, when desired, to adapt it to engage with a link of the chain and operate as a chain-tightener through the eccentric throw of the dog when operated. The rear face of the dog is recessed or concaved, as at $k$, to receive and create a bearing for the end of the handle. When the end of the dog is not slotted or is not adapted to positively engage with the chain, the chain can be tightened around the pipe by screwing the handle in and pushing the dog forward, and thereby forcing the pipe into the bite of the chain until all of the slack is taken up.

In Fig. 2 I show the sleeve provided with an internal shoulder $m$ at the front end of the thread, which limits the movement of the handle in the sleeve; but it is evident that this shoulder can be omitted when it is desired to give the handle more movement. In the same figure I also show the dog-head as provided with a shoulder $n$, which is adapted to engage with the sleeve and prevent the dog from falling over; but it is evident that this shoulder may be varied in size or form or omitted entirely; but when it is used the dog is always in position ready for use and requires no manipulation to place it in proper position.

What I claim as my invention, and desire to secure by Letters Patent, is—

1. In a pipe-wrench, the combination, with the internally-threaded sleeve, the dog pivoted upon an arm extending from the outer end thereof, and the chain connected thereto, of a screw-threaded handle inserted through the sleeve and engaging with the dog.

2. In a pipe-wrench, the combination, with the internally-threaded sleeve, the screw-threaded handle inserted therein, and the chain connected to the sleeve, of the toothed dog pivoted upon an arm projecting from the outer end of the sleeve and having its free end adapted to engage with a link of the chain.

3. The combination, with the internally-threaded sleeve and the chain connected thereto, of the dog pivoted upon an arm extending from the outer end thereof, its free end adapted to engage with a link of the chain, and the screw-threaded handle inserted through the sleeve and engaging with the said dog.

In witness whereof I have hereunto set my hand this 14th day of March, 1892.

GEO. S. HILTS.

In presence of—
HOWARD P. DENISON,
C. W. SMITH.